US011999273B2

United States Patent
Epaud et al.

(10) Patent No.: US 11,999,273 B2
(45) Date of Patent: Jun. 4, 2024

(54) VEHICLE SEAT

(71) Applicant: FAURECIA Sièges d'Automobile, Nanterre (FR)

(72) Inventors: David Epaud, Nanterre (FR); Andreas Rohlfing, Nanterre (FR); Lucasz Tyl, Nanterre (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 202 days.

(21) Appl. No.: 17/388,726

(22) Filed: Jul. 29, 2021

(65) Prior Publication Data

US 2022/0032828 A1    Feb. 3, 2022

(30) Foreign Application Priority Data

Jul. 31, 2020 (FR) ...................................... 20 08144

(51) Int. Cl.
*B60N 2/30* (2006.01)

(52) U.S. Cl.
CPC .......... *B60N 2/3059* (2013.01); *B60N 2/3011* (2013.01)

(58) Field of Classification Search
CPC .. B60N 2/3059; B60N 2/3011; B60N 2/3047; B60N 2/305; B60N 2/3013; B60N 2/30; B60N 2/3009; B60N 2/04; B60N 2/045; B60N 2/1605; B60N 2/161; B60N 2/1615; B60N 2/206; B60N 2/3075; B60N 2/3079; B60N 2/36

See application file for complete search history.

(56) References Cited

U.S. PATENT DOCUMENTS

| | | | | |
|---|---|---|---|---|
| 9,637,027 B2* | 5/2017 | Seigel | ............... | B60N 2/01583 |
| 10,518,663 B1* | 12/2019 | Kakishima | ........... | B60N 2/0155 |
| 10,543,760 B2* | 1/2020 | Yamabe | ............... | B60N 2/4221 |
| 10,960,789 B2* | 3/2021 | Motoi | ...................... | B60N 2/22 |
| 2017/0113575 A1* | 4/2017 | Epaud | .................... | B60N 2/309 |
| 2019/0389335 A1* | 12/2019 | Epaud | ..................... | B60N 2/32 |

(Continued)

FOREIGN PATENT DOCUMENTS

| | | | | |
|---|---|---|---|---|
| DE | 102011120528 A1 | 6/2013 | | |
| EP | 2284039 A1 * | 2/2011 | ............... | B60N 2/12 |

(Continued)

OTHER PUBLICATIONS

French Preliminary Search Report for French App. No. FR2008144 dated Apr. 21, 2021, 9 pages, No. English Translation Available.

*Primary Examiner* — Amy R Weisberg
*Assistant Examiner* — Sara Laghlam
(74) *Attorney, Agent, or Firm* — Barnes & Thornburg LLP

(57) ABSTRACT

A vehicle seat comprising a base, intended to be connected to the floor of the vehicle, a seating portion frame, hinged to the base so as to pivot about a transverse axis of the seat, a backrest hinged to the base so as to pivot about the transverse axis of the seat, hinge means connecting the seating portion frame to the backrest, configured so that the pivoting of the backrest relative to the base about the transverse axis causes the pivoting of the seating portion frame relative to the base about the transverse axis. The hinge means are also configured so as to connect the seating portion frame to the floor in order to move the front edge of the seating portion frame closer to or further away from the floor, the rear edge remaining fixed relative to the base.

12 Claims, 6 Drawing Sheets

(56) References Cited

U.S. PATENT DOCUMENTS

| | | | | |
|---|---|---|---|---|
| 2020/0101873 A1* | 4/2020 | Cluet | ................... | B60N 2/3011 |
| 2020/0406791 A1* | 12/2020 | Epaud | .................... | B60N 2/231 |
| 2021/0086664 A1* | 3/2021 | Epaud | ................ | B60N 2/02246 |
| 2021/0094452 A1* | 4/2021 | Epaud | .................. | B60N 2/3065 |

FOREIGN PATENT DOCUMENTS

| | | |
|---|---|---|
| GB | 2337925 A | 12/1999 |
| JP | 406039566 U | 5/1994 |

\* cited by examiner

VEHICLE SEAT

PRIORITY CLAIM

This application claims priority to French Application No. FR20 08144, filed Jul. 31, 2020, which is expressly incorporated by reference herein.

BACKGROUND

The present disclosure relates to a vehicle seat, and in particular a motor vehicle seat, as well as to a vehicle equipped with such a seat.

SUMMARY

According to the present disclosure, a vehicle seat comprises a base, intended to be connected to the floor of the vehicle, a seating portion frame having a front edge and a rear edge, the seating portion frame being hinged to the base at its rear edge so as to pivot about a first transverse axis of the seat between at least one raised position and one folded position, and a backrest hinged to the base so as to pivot about the first transverse axis of the seat between at least one raised position and one folded position.

In illustrative embodiments, the seat further comprises hinge means connecting the seating portion frame to the backrest, the hinge means being configured so that the pivoting of the backrest relative to the base about the first transverse axis, between its raised position and its folded position, causes the pivoting of the seating portion frame relative to the base about the first transverse axis, between its raised position and its folded position, the backrest being pressed against the seating portion frame in their respective folded position.

In illustrative embodiments, the hinge means are also configured so as to connect the seating portion frame to the floor of the vehicle in order to bring the front edge of the seating portion frame closer to or further away from the floor of the vehicle, with the rear edge of the seating portion frame remaining fixed relative to the base.

In illustrative embodiments, the hinge means comprises an upper connecting rod having a first longitudinal end and a second longitudinal end, the upper connecting rod being hinged at its first longitudinal end to the seating portion frame, at its front edge, so as to pivot about a second transverse axis of the seat,

- a lower connecting rod having a first longitudinal end and a second longitudinal end, the lower connecting rod being hinged to the second longitudinal end of the upper connecting rod at an intermediate hinge point located between its first longitudinal end and its second longitudinal end, so as to pivot about a third transverse axis of the seat, the lower connecting rod being configured to be hinged to the vehicle floor at its second longitudinal end, so as to pivot about a fourth transverse axis of the seat, the second longitudinal end of the lower connecting rod remaining fixed relative to the base,
- a side connecting rod having a first longitudinal end and a second longitudinal end, the side connecting rod being hinged at its first longitudinal end to the lower connecting rod at its first longitudinal end, so as to pivot about a fifth transverse axis of the seat, the side connecting rod also being hinged at its second longitudinal end to the backrest, so as to pivot about a sixth transverse axis of the seat;

the hinge means comprise:
two upper connecting rods: a first upper connecting rod and a second upper connecting rod, identical and parallel to each other, and/or
two lower connecting rods: a first lower connecting rod and a second lower connecting rod, identical and parallel to each other, and/or
two side connecting rods: a first side connecting rod and a second side connecting rod, identical and parallel to each other;
the hinge means comprise the two upper connecting rods: the first upper connecting rod and the second upper connecting rod, identical and parallel to each other, the front edge and the rear edge of the seating portion frame being connected to each other by a first side edge and a second side edge, and the first upper connecting rod is hinged at its first longitudinal end to the seating portion frame so as to pivot about the second transverse axis at the first side edge of the seating portion frame, and the second upper connecting rod is hinged at its first longitudinal end to the seating portion frame so as to pivot about the second transverse axis at the second side edge of the seating portion frame;
the backrest has a lower portion extending under the seating portion frame according to the vertical direction of the seat, at least when the backrest is in its raised position, and the second longitudinal end of the or of each side connecting rod is hinged to the backrest along the sixth transverse axis at the lower portion of the backrest;
the hinge means comprise the two side connecting rods: the first side connecting rod and the second side connecting rod, identical and parallel to each other, and the backrest has two side walls: a first side wall and a second side wall, parallel to each other, and the first side connecting rod is hinged at its second longitudinal end to the backrest so as to pivot about the sixth transverse axis at the first side wall of the backrest, and the second side connecting rod is hinged at its second longitudinal end to the backrest so as to pivot about the sixth transverse axis at the second side wall of the backrest;
the lower connecting rod is hinged at its second longitudinal end so as to pivot about the fifth transverse axis, to an anchoring means that anchors the seat to the vehicle floor;
the first longitudinal end and the intermediate hinge point of the lower connecting rod are offset along the transverse direction of the seat, from the second longitudinal end of the lower connecting rod;
the seat comprises a drive means configured to cause the pivoting of the backrest relative to the base about the first transverse axis, and simultaneously, by means of the hinge means, the pivoting of the seating portion frame relative to the base about the first transverse axis;
the drive means comprises an electric motor connected to the backrest or to the rear edge of the seating portion frame, so as to cause the pivoting of the backrest relative to the base about the first transverse axis, respectively the pivoting of the seating portion frame relative to the base about the first transverse axis.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
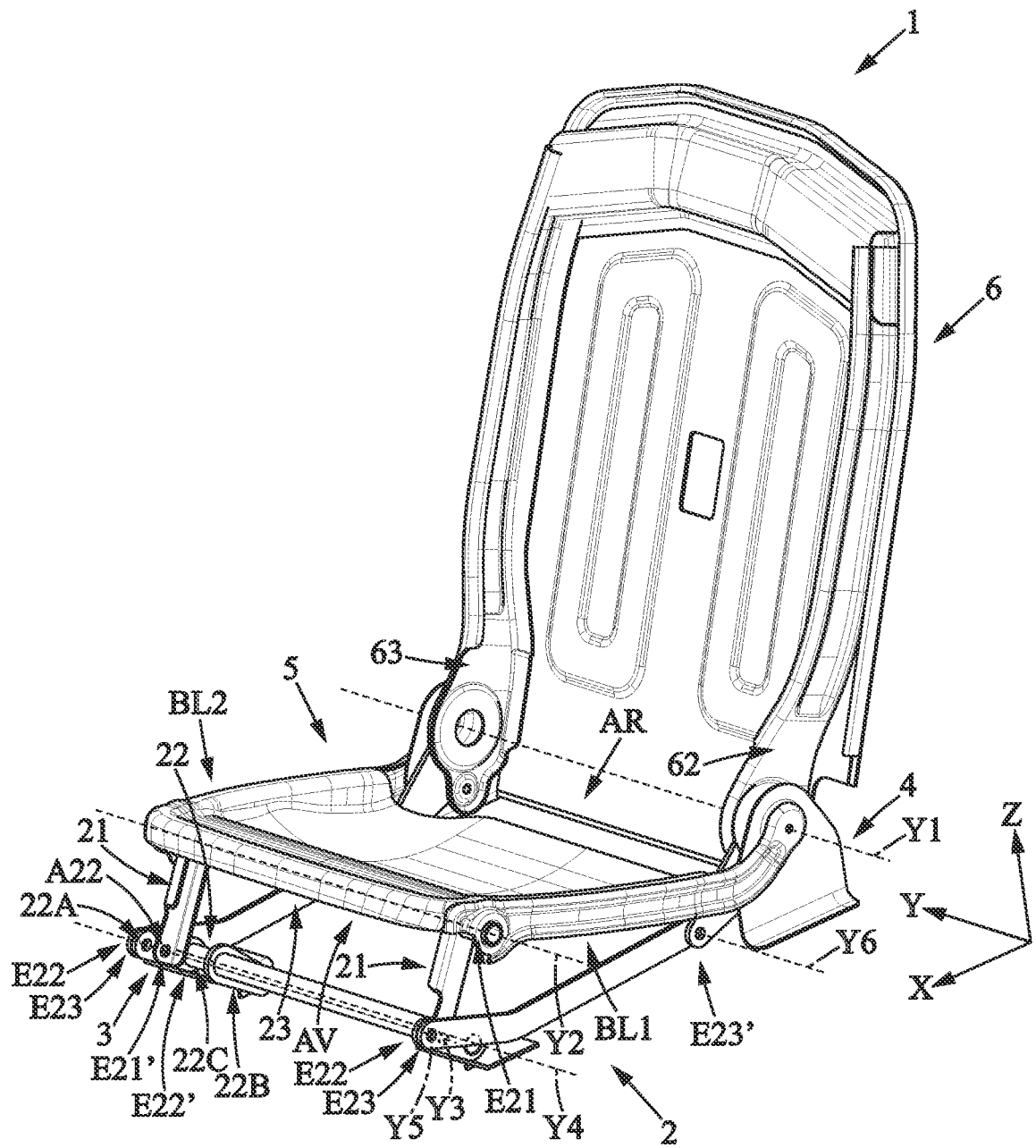
FIG. 1 shows a perspective view of a seat according to one embodiment of the present disclosure, in a first configuration called the nominal configuration.

Throughout this application, the spatial directions are defined as follows: the longitudinal direction X of the seat corresponds to the direction in which the seat slides on runners relative to the floor of the vehicle, when the seat includes runners as means for anchoring the seat to the floor of the vehicle, received in the lower frame of the seat as shown in the exemplary embodiments of FIGS. 1 to 4B, the vertical direction Z of the seat corresponds to the direction perpendicular to the plane of the vehicle floor to which the seat is fixed, perpendicular as well to the longitudinal direction of the seat defined above, as shown in the exemplary embodiments of FIGS. 1 to 4B, the transverse direction Y of the seat is the direction perpendicular to the longitudinal direction and to the vertical direction, as shown in the exemplary embodiments of FIG. 1.

An axis is defined as a straight line in a defined direction. For example, a longitudinal axis is an axis along the longitudinal direction.

Also, front and rear are understood to mean according to the longitudinal direction of the seat, with an orientation from the rear edge of the lower frame, where a seat backrest is hinged, towards the front edge of the lower frame.

Similarly, upper and lower are understood to mean along the vertical direction of the seat, with an orientation from the anchoring means which anchor the lower frame of the seat to the vehicle floor, towards the seat backrest.

Finally, throughout the present application, substantially longitudinal, transverse, or vertical is understood to mean an orientation, relative to the longitudinal direction, the vertical direction, or the transverse direction, forming an angle of less than 30°, which can advantageously be zero.

Similarly, substantially parallel or perpendicular is understood to mean an orientation, relative to a given element, forming an angle of less than 30°, which can advantageously be zero, with a line parallel, respectively perpendicular to this element.

The present disclosure relates to a vehicle seat 1 comprising: a base 4, intended to be connected to the floor P of the vehicle, a seating portion frame 5 having a front edge AV and a rear edge AR, the seating portion frame 5 being hinged to the base 4 at its rear edge AR so as to pivot about a first transverse axis Y1 of the seat 1 between at least one raised position and one folded position, a backrest 6 hinged to the base 4 so as to pivot about the first transverse axis Y1 of the seat 1 between at least one raised position and one folded position.

According to the present disclosure, the seat 1 further comprises hinge means 2 connecting the seating portion frame 5 to the backrest 6, the hinge means 2 being configured so that the pivoting of the backrest 6 relative to the base 4 about the first transverse axis Y1, between its raised position and its folded position, causes the pivoting, advantageously simultaneous, of the seating portion frame 5 relative to the base 4 about the first transverse axis Y1, between its raised position and its folded position, the backrest 6 being pressed against the seating portion frame 5 in their respective folded position.

According to the present disclosure, the hinge means 2 are also configured so as to connect the seating portion frame 5 to the vehicle floor so as to bring the front edge AV of the seating portion frame 5 closer to or further away from the vehicle floor P, the rear edge AR of the seating portion frame 5 remaining fixed relative to the base 4.

Thus, and as can be seen in the exemplary embodiments of FIGS. 1 to 4B, it is possible to transition the seat 1 of the present disclosure from a nominal configuration (FIGS. 1, 2A, and 2B) to a folded configuration (FIGS. 4A and 4B) via an intermediate configuration (FIGS. 3A and 3B), without movement of the seating portion frame 5, and in particular its rear edge AR, along a substantially longitudinal direction of the seat 1 relative to the base 4, and therefore relative to the floor P of the vehicle, when the base 4 is fixed thereto.

With the seat 1 according to the present disclosure, the transition from a nominal configuration to a folded configuration can be done easily, even if the space behind the seat 1 or in front of the seat 1 is limited.

Figure 2A:
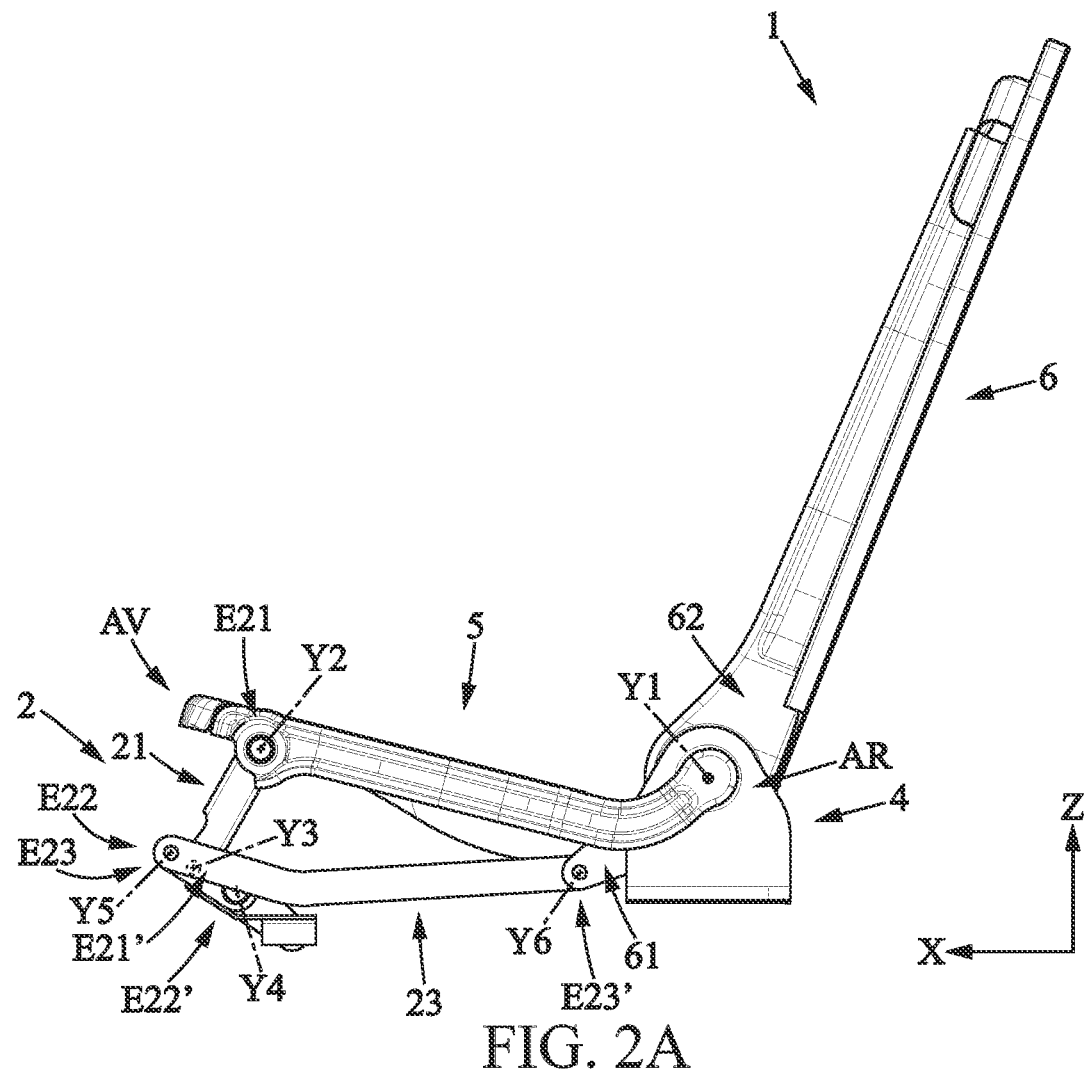
FIG. 2A shows a left view of the seat of FIG. 1, in the nominal configuration.
Figure 2B:
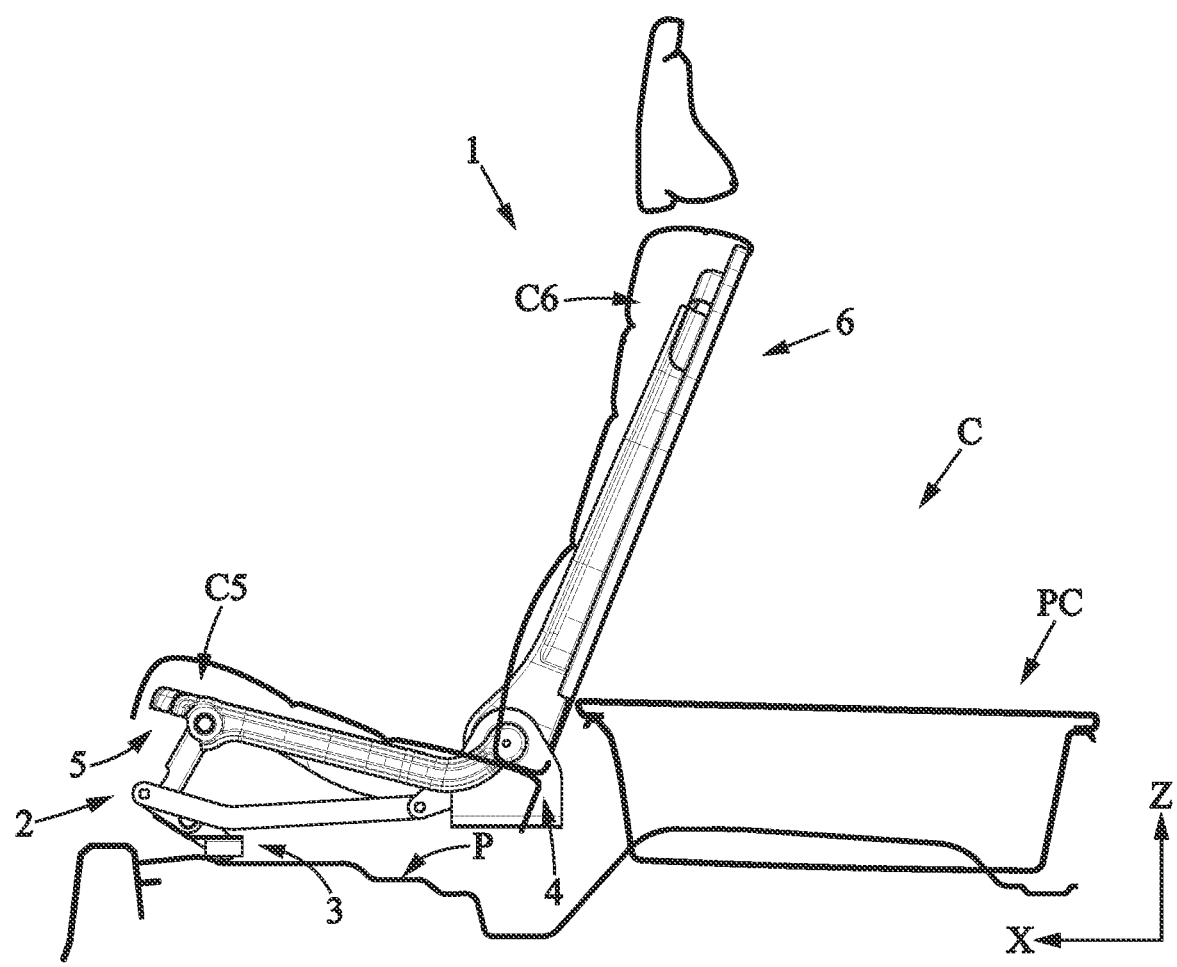
FIG. 2B shows the seat of FIG. 2A, showing the cushions covering the seating portion and backrest.
Figure 3A:
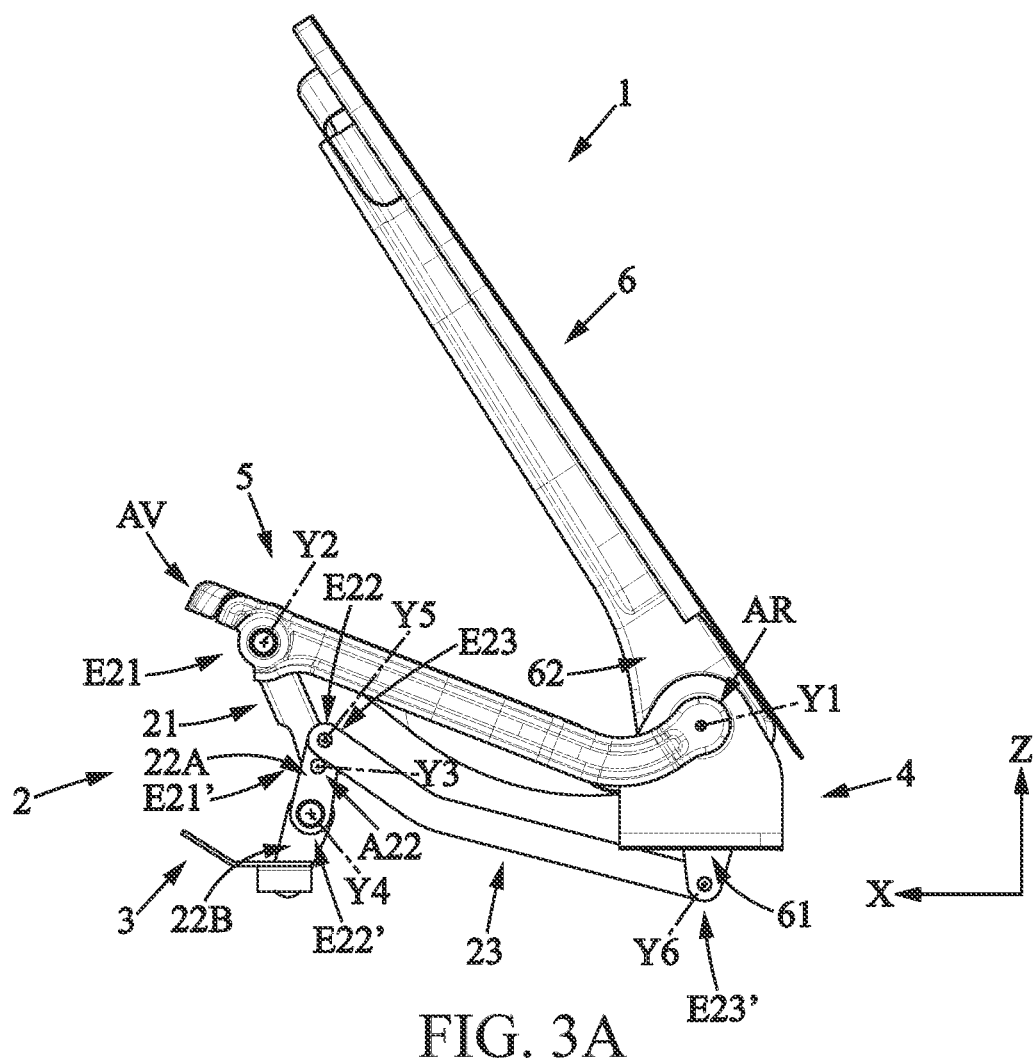
FIG. 3A shows a left view of the seat of FIG. 1, in a second configuration called an intermediate configuration.
Figure 3B:
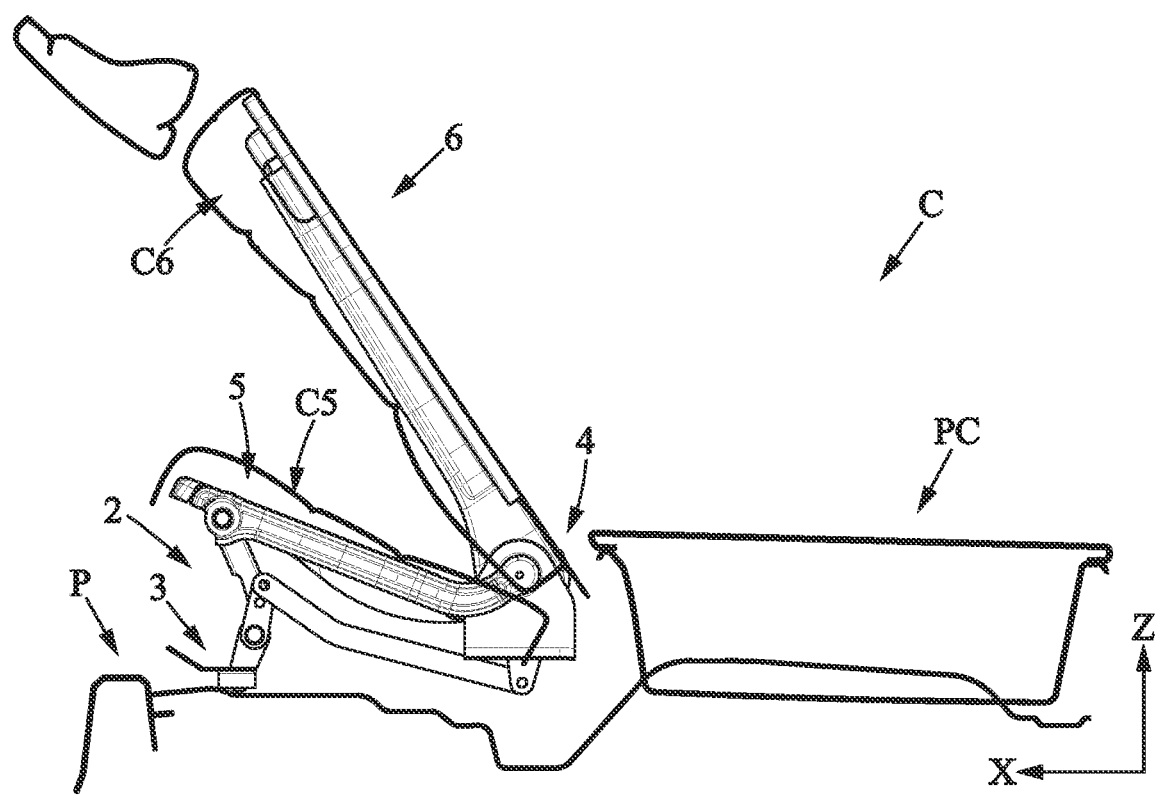
FIG. 3B shows the seat of FIG. 3A, showing the cushions covering the seating portion and backrest.
Figure 4A:
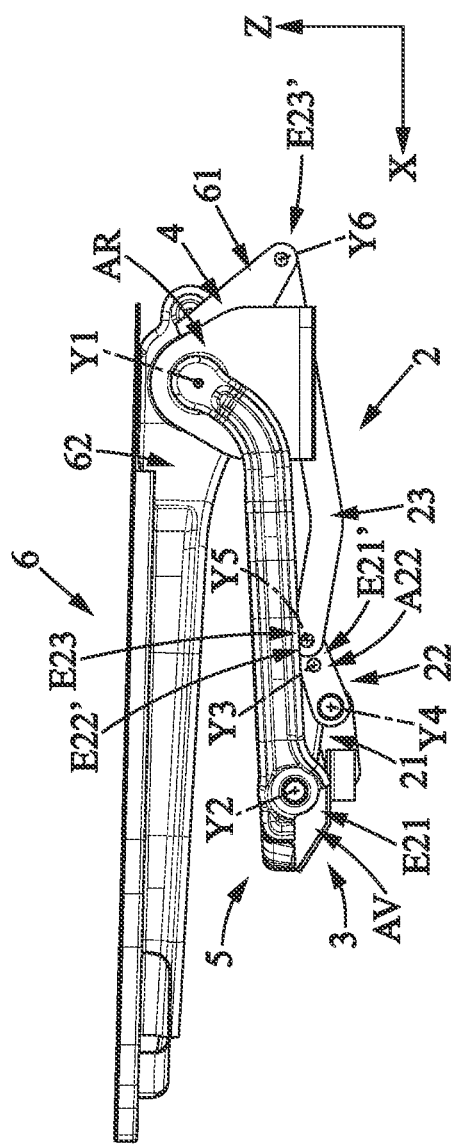
FIG. 4A shows a left view of the seat of FIG. 1, in a third configuration called the folded configuration.
Figure 4B:
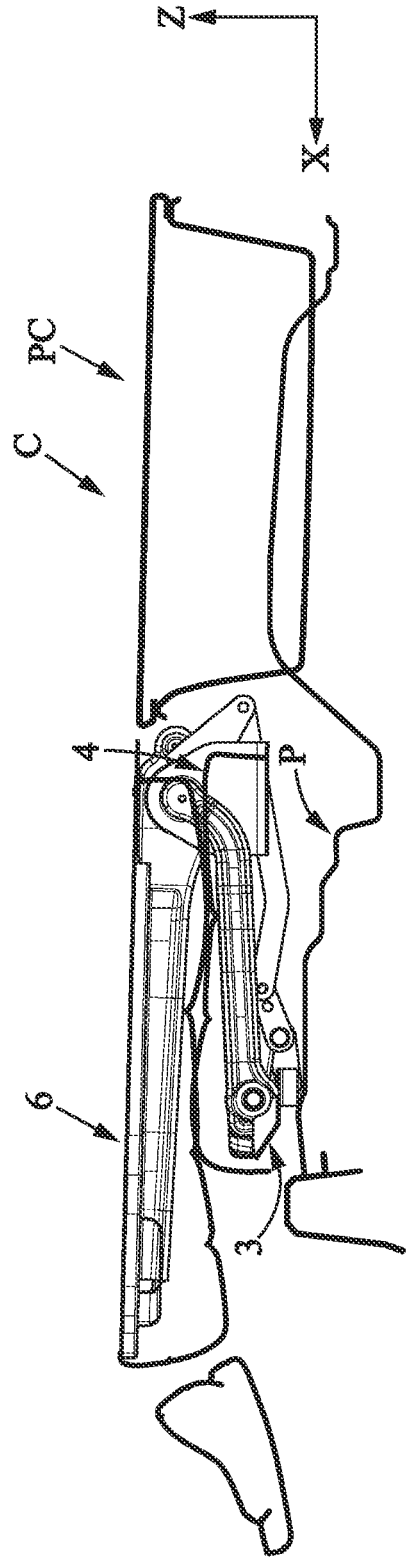
FIG. 4B shows the seat of FIG. 4A, showing the cushions covering the seating portion and backrest.

In addition, and as is more particularly visible in the exemplary embodiments of FIGS. 2B, 3B, 4B, in which the cushions of the seating portion C5 and of the backrest C6 are shown, respectively covering the backrest 6 and the seating portion frame 5, the cushions of the seating portion C5 and backrest C6 have a simple standard shape, which does not interfere with the relative movement between the seating portion frame 5 and the backrest 6 when transitioning from one configuration of the seat 1 to the other, the rear edge AR of the seating portion frame 5 remaining fixed relative to the portion of the backrest 6 that is hinged to the base 4.

Due to this advantageous arrangement of the present disclosure, the length of the cushion C5 of the seating portion, substantially in the longitudinal direction X of the seat 1, can be maximized at the rear edge AR of the seating portion frame 5, which improves the comfort for an occupant seated on the seat 1 of the present disclosure.

As can be seen in the embodiments of FIGS. 1, 2A, and 2B, the so-called nominal configuration of the seat 1 corresponds to the configuration of the seat 1 in which the backrest 6 and the seating portion frame 5 are each located in their raised position, the backrest 6 extending in a substantially vertical direction of the seat 1, while the seating portion frame 5 extends in a substantially longitudinal direction of the seat 1 that is substantially perpendicular to the backrest 6 and substantially parallel to the floor P of the vehicle. The front edge AV of the seating portion frame 5 may be substantially at the same level, along the vertical direction Z of the seat 1, as the rear edge AR of the seating portion frame 5.

The nominal configuration of the seat 1 corresponds to a configuration of seat 1 enabling an occupant to sit on it.

As can be seen in the embodiments of FIGS. 4A and 4B, the so-called folded configuration of the seat 1 corresponds to the configuration of the seat 1 in which the backrest 6 and the seating portion frame 5 are each in their folded position, the backrest 6 extending in a substantially longitudinal direction of the seat 1, advantageously substantially parallel to the floor P of the vehicle, while the seating portion frame 5 also extends in a substantially longitudinal direction of the seat 1, also advantageously substantially parallel to the floor P of the vehicle, and such that the backrest 6 is pressed against the seating portion frame 5. The front edge AV of the seating portion frame 5 may be located below the rear edge AR of the seating portion frame 5, according to the vertical direction Z of the seat 1.

The folded configuration of the seat 1 corresponds to a configuration of the seat 1 that reduces the size of the seat 1 along a substantially vertical direction of the vehicle, corresponding substantially to the vertical direction Z of the seat 1, and that maximizes the space available above the backrest 6 along the vertical direction Z of the seat 1, for example to allow loading goods of large dimensions into the trunk C of the vehicle when the seat 1 is part of a row of seats at the rear of the vehicle, just in front of the trunk C, as shown for example in the embodiments of FIGS. 2B, 3B, and 4B.

Advantageously, and as can be seen more particularly in the exemplary embodiment of FIG. 4B, the backrest 6 may be configured to come to lie flush with the floor PC of the trunk C, when the seat 1 is in its folded position.

An intermediate configuration of the seat 1 is shown in the exemplary embodiments of FIGS. 3A and 3B, in which the backrest 6 and the seating portion frame 5 are each in an intermediate position between their raised position and their folded position.

Advantageously, the seat 1 according to the present disclosure may also be configured so as to also have a so-called comfort configuration, in which the backrest 6 is tilted rearward relative to the nominal configuration, in other words brought closer to the floor P of the vehicle, for example by being tilted rearward relative to its raised position by a value of between 5° and 25°, preferably between 7° and 15°.

Advantageously, and as can be seen in the exemplary embodiments of FIGS. 1 to 4B, the hinge means 2 are configured so as to be located between the floor P of the vehicle to which the seat 1 is connected and the seating portion frame 5 of the seat 1, according to the vertical direction Z of the seat 1, regardless of the configuration of the seat 1, for example nominal, folded, or intermediate.

According to one embodiment, the hinge means 2 comprise: an upper connecting rod 21 having a first longitudinal end E21 and a second longitudinal end E21', the upper connecting rod 21 being hinged at its first longitudinal end E21 to the seating portion frame 5 at its front edge AV, so as to pivot about a second transverse axis Y2 of the seat 1, a lower connecting rod 22 having a first longitudinal end E22 and a second longitudinal end E22', the lower connecting rod 22 being hinged to the second longitudinal end E21' of the upper connecting rod 21, at an intermediate hinge point A22 located between its first longitudinal end E22 and its second longitudinal end E22', so as to pivot about a third transverse axis Y3 of the seat 1, the lower connecting rod 22 being configured to be hinged to the floor P of the vehicle at its second longitudinal end E22', so as to pivot about a fourth transverse axis Y4 of the seat 1, the second longitudinal end E22' of the lower connecting rod 22 remaining fixed relative to the base 4, a side connecting rod 23 having a first longitudinal end E23 and a second longitudinal end E23', the side connecting rod 23 being hinged at its first longitudinal end E23 to the lower connecting rod 22 at its first longitudinal end E22 so as to pivot about a fifth transverse axis Y5 of the seat 1, the side connecting rod 23 also being hinged to the backrest 6 at its second longitudinal end E23' so as to pivot about a sixth transverse axis Y6 of the seat 1.

Such a design of the hinge means 2, with only three connecting rods 21, 22, 23 hinged together, is particularly simple and makes it possible to reduce the cost of the seat 1, in order to obtain kinematics of the seat 1 for transitioning from a nominal configuration to a folded configuration where there is no movement of the seating portion frame 5, and in particular its rear edge AR, towards the rear of the seat 1.

As can be seen in the embodiments of FIGS. 1, 2A, and 2B, in the nominal configuration of the seat 1, when the backrest 6 and the seating portion frame 5 are each in their raised position, the upper connecting rod 21, the lower connecting rod 22, and the side connecting rod 23 are located in a position such that the second longitudinal end E21' of the upper connecting rod 21, the first longitudinal end E22 of the lower connecting rod 22, and the first longitudinal end E23 of the side connecting rod 23, are located in front of the front edge AV of the seating portion frame 5, according to the longitudinal direction X of the seat 1.

When the seat 1 transitions from the nominal configuration to the folded configuration, by the pivoting of the seating portion frame 5 and backrest 6 relative to the base 4, about the first transverse axis Y1, between their respective raised position and folded position, the second longitudinal end E21' of the upper connecting rod 21, the first longitudinal end E22 of the lower connecting rod 22, and the first longitudinal end E23 of the side connecting rod 23 move rearward relative to the front edge AV of the seating portion frame 5, along the longitudinal direction X of the seat 1.

Thus, and as can be seen in the embodiments of FIGS. 4A and 4B, the second longitudinal end E21' of the upper connecting rod 21, the first longitudinal end E22 of the lower connecting rod 22, and the first longitudinal end E23 of the side connecting rod 23 are located close to the seating portion frame 5 in the folded configuration, the upper connecting rod 21, the lower connecting rod 22, and the side connecting rod 23 then being substantially parallel to each other, in order to minimize the size of the seat 1 along its vertical direction Z, which makes it possible to maximize the space above the backrest 6, in the vertical direction Z of the seat 1, in the folded configuration of the seat 1.

According to one embodiment, the hinge means 2 comprise: two upper connecting rods 21: a first upper connecting rod 21 and a second upper connecting rod 21, identical and parallel to each other, and/or two lower connecting rods 22: a first lower connecting rod 22 and a second lower connecting rod 22, identical and parallel to each other, and/or two side connecting rods 23: a first side connecting rod 23 and a second side connecting rod 23, identical and parallel to each other.

This advantageous arrangement of the present disclosure makes it possible to distribute the forces between each of the connecting rods 21, 22, 23 of each pair of connecting rods, in particular in the transverse direction Y of the seat 1, in order to avoid damaging them, in particular in the event of significant forces to be absorbed, for example in the event of an impact of the vehicle receiving the seat 1 according to the present disclosure.

This also improves the stability of the seat 1 relative to the vehicle to which it is fixed.

According to one embodiment, in the case where the hinge means 2 comprise the two upper connecting rods 21: the first upper connecting rod 21 and the second upper connecting rod 21, identical and parallel to each other, and in the case where, as can be seen in the embodiment of FIG. 1, the front edge AV and the rear edge AR of the seating portion frame 5 are connected to each other by a first side edge BL1 and a second side edge BL2, the first upper connecting rod 21 can be hinged at its first longitudinal end E21 to the seating portion frame 5 so as to pivot about the second transverse axis Y2 at the first side edge BL1 of the seating portion frame 5, and the second upper connecting rod 21 can be hinged at its first longitudinal end E21 to the seating portion frame 5 so as to pivot about the second transverse axis Y2 at the second side edge BL2 of the seating portion frame 5.

The attachment of the seating portion frame 5 to the vehicle, at its front edge AV, can thus be balanced, in particular in the transverse direction Y of the seat 1.

Advantageously and as can be seen more particularly in the exemplary embodiments of FIGS. 1 and 2A, the first longitudinal end E21 of each of the upper connecting rods 21 can be fixed to the seating portion frame 5 at the intersection between the front edge AV and each of the side edges BL1, BL2 of the seating portion frame 5.

According to one embodiment, the backrest 6 has a lower portion 61 extending under the seating portion frame 5 according to the vertical direction Z of the seat 1, at least when the backrest 6 is in its raised position, the second longitudinal end E23' of the or of each side connecting rod 23 being hinged to the backrest 6 along the sixth transverse axis Y6 at the lower portion 61 of the backrest 6.

Thus, and as can be seen in the embodiments of FIGS. 1, 2A, 3A, and 4A, the second longitudinal end E23' of the side connecting rod 23 is distanced from the first transverse axis Y1, in order to provide an arm of sufficient leverage that the pivoting of the backrest 6 relative to the base 4 about the first transverse axis Y1 causes displacement of the side connecting rod and causes the simultaneous pivoting of the seating portion frame 5 relative to the base 4 about the first transverse axis Y1.

Also, and as is more particularly visible in the embodiment of FIG. 4A, by means of this advantageous arrangement of the present disclosure, in the folded configuration of the seat 1, the second longitudinal end E23' of the side connecting rod 23 is located slightly to the rear of the base 4 along the longitudinal direction X of the seat 1, which makes it possible to minimize the size of the seat 1 in its vertical direction Z, in the folded configuration.

According to one embodiment, in which the hinge means 2 comprise the two side connecting rods 23: the first side connecting rod 23 and the second side connecting rod 23, identical and parallel to each other, and in which the backrest has two side walls 62, 63: a first side wall 62 and a second side wall 63, parallel to each other, the first side connecting rod 23 can be hinged at its second longitudinal end E23' to the backrest 6 so as to pivot about the sixth transverse axis Y6 at the first side wall 62 of the backrest 6, and the second side connecting rod 23 can be hinged at its second longitudinal end E23' to the backrest 6 so as to pivot about the sixth transverse axis Y6 at the second side wall 63 of the backrest 6.

The connection of the backrest 6 to the seating portion frame 5 and to the base 4 of the seat 1, and in particular at its lower portion 61, is thus balanced, in particular along the transverse direction Y of the seat 1.

According to one embodiment, the lower connecting rod 22 is hinged at its second longitudinal end E22' so as to pivot about the fifth transverse axis Y5, to an anchoring means 3 that anchors the seat 1 to the floor P of the vehicle.

As can be seen in the embodiments of FIGS. 1 to 4B, the anchoring means may be provided separate from the base 4, and located substantially opposite the front edge AV of the seating portion frame 5 along the vertical direction Z of the seat 1.

According to one embodiment, the first longitudinal end E22 and the intermediate hinge point A22 of the lower connecting rod 22 are offset along the transverse direction Y of the seat 1, from the second longitudinal end E22' of the lower connecting rod 22.

This advantageous arrangement of the present disclosure makes it possible to minimize the size of the or of each of the lower connecting rods 22.

Thus, and as can be seen more particularly in the embodiments of FIGS. 1 and 3A, the first longitudinal end E22 and the intermediate hinge point A22 of the lower connecting rod 22 can be provided on a first portion 22A of the lower connecting rod 22, while the second longitudinal end E22' can be provided on a second portion 22B of the lower connecting rod 22, the first portion 22A being offset from the second portion 22B along the transverse direction Y of the seat 1.

A bracing portion 22C, extending substantially in the transverse direction Y of the seat 1, may be provided to connect the first portion 22A to the second portion 22B.

As can be seen in the embodiment of FIG. 1, the bracing portion 22C may extend between the first lower connecting rod 22 and the second lower connecting rod 22, when the seat 1 comprises two lower connecting rods 22, so as to stiffen the connection of the seat 1 to the floor of the vehicle, along the transverse direction Y of the seat 1.

The bracing portion 22C can then also serve as a control means for driving the pivoting of the lower connecting rods 22 and therefore, by means of the other elements of the hinge means 2, the pivoting of the seating portion frame 5 and of the backrest 6 relative to the base 4 about the first transverse axis Y1.

A bracing portion, also extending substantially in the transverse direction Y of the seat 1, may additionally or alternatively be provided, connecting the first upper connecting rod 21 to the second upper connecting rod 21 and/or the first side connecting rod 23 to the second side connecting rod 23, also so as to stiffen the connection of the seat 1 to the floor P of the vehicle, along the transverse direction Y of the seat 1, or to serve as a control means for driving the pivoting of the seating portion frame 5 and of the backrest 6 relative to the base 4 about the first transverse axis Y1.

According to one embodiment, the seat 1 also comprises a drive means (not shown) configured to cause the pivoting of the backrest 6 relative to the base 4 about the first transverse axis Y1 and simultaneously, via the hinge means 2, to cause the pivoting of the seating portion frame 5 relative to the base 4 about the first transverse axis Y1.

This makes it possible to facilitate the transition of the seat 1 from one configuration to the other without requiring a user to exert physical effort, which can be significant, to pivot the backrest 6 or seating portion frame 5 relative to the base 4 about the first transverse axis Y1.

The drive means, in particular when it is an electric drive means, may be connected to an electronic control unit enabling control of the movements of the seat 1 so as to transition from one configuration to the other.

Additionally or alternatively, the seat 1 may be configured so that driving the pivoting of the backrest 6 relative to the base 4 about the first transverse axis Y1 and simultaneously, via the hinge means 2, the pivoting of the seating portion frame 5 relative to the base 4 about the first transverse axis Y1, is done manually by an operator, for example by the occupant of the seat 1, for example by means of a bracing portion as described above.

According to one embodiment, the drive means comprises an electric motor (not shown) connected to the backrest 6 or to the rear edge AR of the seating portion frame 5 so as to cause the pivoting of the backrest 6 relative to the base 4 about the first transverse axis Y1, respectively to cause the pivoting of the seating portion frame 5 relative to the base 4 about the first transverse axis Y1.

The electric motor may be connected to the backrest 6 or to the seating portion frame 5 of the seat 1 directly or by means of a transmission means, for example such as a gear motor.

Additionally or alternatively, the drive means, or a separate other drive means, may be provided to cause the pivoting of the upper connecting rod 21 and/or the lower connecting rod 22 and/or the side connecting rod 23 respectively about the second transverse axis Y2, the third transverse axis Y3, the fourth transverse axis Y4, the fifth transverse axis Y5, or the sixth transverse axis Y6.

According to the findings of the inventor, by providing an electric motor-driven pivoting of the backrest 6 relative to the base 4 about the first transverse axis Y1 or pivoting of the seating portion frame 5 relative to the base 4 about the first transverse axis Y1, this requires a lower motor torque to be supplied by the electric motor than for driving the upper connecting rod 21 and/or the lower connecting rod 22 and/or the side connecting rod 23.

The present disclosure also relates to a vehicle comprising a seat 1 according to one of the embodiments described above.

The seat 1 can then be connected to the floor P of the vehicle via the base 4, and also via the one or more anchoring means 3 when the base comprises one or more of these.

The vehicle may in particular be a motor vehicle.

According to one embodiment of the vehicle, the seat 1 is part of a second row of seats or a third row of seats.

Indeed, as explained above, the seat 1 of the present disclosure is particularly suitable for a seat in a second row or third row of seats for which the space behind or even in front, according to the longitudinal direction of the vehicle which generally substantially corresponds to the longitudinal direction of the seats, is limited, and in particular in the case where the second or third row of seats is located immediately in front of the trunk C of the vehicle, as can be seen in the exemplary embodiments of FIGS. 2B, 3B, and 4B.

Of course, other embodiments are conceivable to those skilled in the art without departing from the scope of the present disclosure defined by the claims below.

The present disclosure relates to a vehicle seat, and in particular a motor vehicle seat, as well as to a vehicle equipped with such a seat.

The present disclosure relates to the field of vehicle seats and in particular to vehicle seats provided for placement at the rear of the vehicle, meaning in a second row of seats or a third row of seats, in particular the row of seats located in front of the trunk of the vehicle.

A vehicle may have a first row of seats, comprising one or more seats arranged side by side in a substantially transverse direction of the vehicle, generally corresponding substantially to the transverse direction of the seats, and one of the seats being provided to accommodate the driver of the vehicle.

Generally, at least a second row of seats is provided, also comprising one or more seats arranged side by side in a substantially transverse direction of the vehicle, the second row being arranged behind the first row of seats in a substantially longitudinal direction of the vehicle, generally corresponding substantially to the longitudinal direction of the seats.

In certain vehicles, and in order to accommodate a large number of passengers, for example more than five, a third row of seats may also be provided, also comprising one or more seats arranged side by side in a substantially transverse direction of the vehicle, the third row being arranged behind the first row of seats in a substantially longitudinal direction of the vehicle.

A comparative vehicle seat, and in particular a seat that is part of the second or third row of seats of the vehicle, comprises: a base, intended to be connected to the floor of the vehicle, a seating portion frame having a front edge and a rear edge that are connected to each other by a first side edge and a second side edge, the seating portion frame generally being connected to the base at its rear edge, a backrest hinged to the base so as to pivot about a first transverse axis of the seat, and configured to pivot relative to the base about the first transverse axis between at least one raised position and one folded position, the backrest being configured to extend in a substantially longitudinal direction of the vehicle in its folded position, pressed against the seating portion frame.

Also, the comparative seating portion frame may also be movable relative to the vehicle floor between a raised position and a folded position, and such that movement of the seating portion frame relative to the floor allows the front edge of the seating portion frame to move closer to or further away from the vehicle floor, the front edge of the seating portion frame being closer to the vehicle floor in the folded position of the seating portion frame than in its raised position.

Thus, when the seating portion frame and the backrest are in their respective folded position so as to minimize the size of the seat in its vertical direction, and so that the space located above the backrest in the vertical direction of the seat, generally corresponding substantially to the vertical direction of the vehicle, is maximized. In its folded position, the backrest may advantageously be located at or even below the floor of the vehicle, and in particular of the trunk of the vehicle, in a substantially vertical direction of the vehicle.

In order to facilitate manipulation of the seat to transition it from a nominal configuration, in which the backrest and the seating portion frame are in their raised position, to a folded configuration, in which the backrest and the seating portion frame are in their folded position, the seating portion frame is generally connected to the backrest, generally by its rear edge, the movement of the seating portion frame relative to the vehicle floor being generally guided by a set of hinged connecting rods.

However, for comparative seats providing such mobility between a nominal configuration and a folded configuration, the connection between the seating portion frame and the backrest is such that the movement of the seating portion frame relative to the base causing the transition of the seating portion frame from its raised position to its folded position necessarily causes a rearward displacement of the rear edge of the seating portion frame in a substantially longitudinal direction of the seat, which has several disadvantages.

First, the space behind the comparative seats of the second row or third row in a substantially longitudinal direction is generally particularly small, especially when this is provided for the trunk of the vehicle.

Therefore, with the comparative seats, the transition from the nominal configuration to the folded configuration may prove to be impossible if the seat is a second or third row seat, because the space available behind the seat for receiving the rear edge of the seating portion frame is reduced, or else this reduced space can only allow a small cleared space above the backrest of the seat in a substantially vertical direction of the vehicle, the backrest not being able to extend in a substantially longitudinal direction of the vehicle, pressed against the seating portion frame.

Conversely, the same problem arises for the transition of the seat from the folded configuration to the nominal configuration when the space in front of the seat, in a substantially longitudinal direction of the seat, is reduced, which is generally the case for a seat in the second or third row because of the presence of the seat(s) in the first row.

Also, in comparative seats, the cushions of the backrest and seating portion which respectively cover the backrest and the seating portion frame of the seat, need to have a complex shape so as not to block the relative movements between the seating portion frame and the backrest when transitioning from the nominal configuration to the folded configuration and vice versa.

These complex shapes of the cushions increase the complexity of their production and increase their cost and therefore that of the seat. They may also make it less comfortable for the seat occupant.

The present disclosure overcomes these disadvantages of comparative vehicle seats, and in particular of comparative vehicle seats that are part of a second or a third row of seats in a vehicle, by providing a vehicle seat that can transition from a nominal configuration to a folded configuration, and vice versa, while maximizing the space above the seat backrest in a substantially vertical direction of the seat in the folded configuration, with reduced space behind and in front of the seat in a substantially longitudinal direction of the seat.

Another object of the present disclosure is to provide such a vehicle seat that is more comfortable for its occupant.

Another object of the present disclosure is to provide such a vehicle seat of simplified design and reduced cost.

A vehicle seat is proposed comprising: a base, intended to be connected to the floor of the vehicle, a seating portion frame having a front edge and a rear edge, the seating portion frame being hinged to the base at its rear edge so as to pivot about a first transverse axis of the seat between at least one raised position and one folded position, a backrest hinged to the base so as to pivot about the first transverse axis of the seat between at least one raised position and one folded position.

According to the present disclosure, the seat further comprises hinge means connecting the seating portion frame to the backrest, the hinge means being configured so that the pivoting of the backrest relative to the base about the first transverse axis, between its raised position and its folded position, causes the pivoting of the seating portion frame relative to the base about the first transverse axis, between its raised position and its folded position, the backrest being pressed against the seating portion frame in their respective folded position.

According to the present disclosure, the hinge means are also configured so as to connect the seating portion frame to the floor of the vehicle in order to bring the front edge of the seating portion frame closer to or further away from the floor of the vehicle, with the rear edge of the seating portion frame remaining fixed relative to the base.

According to optional features of the present disclosure, applied alone or in combination: the hinge means comprise:
an upper connecting rod having a first longitudinal end and a second longitudinal end, the upper connecting rod being hinged at its first longitudinal end to the seating portion frame, at its front edge, so as to pivot about a second transverse axis of the seat,
a lower connecting rod having a first longitudinal end and a second longitudinal end, the lower connecting rod being hinged to the second longitudinal end of the upper connecting rod at an intermediate hinge point located between its first longitudinal end and its second longitudinal end, so as to pivot about a third transverse axis of the seat, the lower connecting rod being configured to be hinged to the vehicle floor at its second longitudinal end, so as to pivot about a fourth transverse axis of the seat, the second longitudinal end of the lower connecting rod remaining fixed relative to the base,
a side connecting rod having a first longitudinal end and a second longitudinal end, the side connecting rod being hinged at its first longitudinal end to the lower connecting rod at its first longitudinal end, so as to pivot about a fifth transverse axis of the seat, the side connecting rod also being hinged at its second longitudinal end to the backrest, so as to pivot about a sixth transverse axis of the seat;
the hinge means comprise:
two upper connecting rods: a first upper connecting rod and a second upper connecting rod, identical and parallel to each other, and/or
two lower connecting rods: a first lower connecting rod and a second lower connecting rod, identical and parallel to each other, and/or
two side connecting rods: a first side connecting rod and a second side connecting rod, identical and parallel to each other;
the hinge means comprise the two upper connecting rods: the first upper connecting rod and the second upper connecting rod, identical and parallel to each other, the front edge and the rear edge of the seating portion frame being connected to each other by a first side edge and a second side edge, and the first upper connecting rod is hinged at its first longitudinal end to the seating portion frame so as to pivot about the second transverse axis at the first side edge of the seating portion frame, and the second upper connecting rod is hinged at its first longitudinal end to the seating portion frame so as to pivot about the second transverse axis at the second side edge of the seating portion frame;
the backrest has a lower portion extending under the seating portion frame according to the vertical direction of the seat, at least when the backrest is in its raised position, and the second longitudinal end of the or of each side connecting rod is hinged to the backrest along the sixth transverse axis at the lower portion of the backrest;
the hinge means comprise the two side connecting rods: the first side connecting rod and the second side connecting rod, identical and parallel to each other, and the backrest has two side walls: a first side wall and a second side wall, parallel to each other, and the first side connecting rod is hinged at its second longitudinal end to the backrest so as to pivot about the sixth transverse axis at the first side wall of the backrest, and the second side connecting rod is hinged at its second longitudinal end to the backrest so as to pivot about the sixth transverse axis at the second side wall of the backrest;

the lower connecting rod is hinged at its second longitudinal end so as to pivot about the fifth transverse axis, to an anchoring means that anchors the seat to the vehicle floor;

the first longitudinal end and the intermediate hinge point of the lower connecting rod are offset along the transverse direction of the seat, from the second longitudinal end of the lower connecting rod;

the seat comprises a drive means configured to cause the pivoting of the backrest relative to the base about the first transverse axis, and simultaneously, by means of the hinge means, the pivoting of the seating portion frame relative to the base about the first transverse axis;

the drive means comprises an electric motor connected to the backrest or to the rear edge of the seating portion frame, so as to cause the pivoting of the backrest relative to the base about the first transverse axis, respectively the pivoting of the seating portion frame relative to the base about the first transverse axis.

The present disclosure also relates to a vehicle comprising a seat according to one of the embodiments described above.

According to one embodiment of the vehicle, the seat is part of a second row of seats or a third row of seats.

Also provided is a vehicle comprising a seat according to the present disclosure.

The features set forth in the following paragraphs may optionally be implemented. They may be implemented independently of one another or in combination with one another.

A vehicle seat (1) comprising: a base (4), intended to be connected to the floor (P) of the vehicle, a seating portion frame (5), hinged to the base (4) so as to pivot about a transverse axis (Y1) of the seat (1), a backrest (6) hinged to the base (4) so as to pivot about the transverse axis (Y1) of the seat (1), hinge means (2) connecting the seating portion frame (5) to the backrest (6), configured so that the pivoting of the backrest (6) relative to the base (4) about the transverse axis (Y1) causes the pivoting of the seating portion frame (5) relative to the base (4) about the transverse axis (Y1).

The hinge means (2) are also configured so as to connect the seating portion frame (5) to the floor (P) in order to move the front edge (AV) of the seating portion frame (5) closer to or further away from the floor (P), the rear edge (AR) remaining fixed relative to the base (4).

The following numbered clauses include embodiments that are contemplated and non-limiting:

Clause 1. A vehicle seat (1) comprising:
a base (4), intended to be connected to the floor (P) of the vehicle,
a seating portion frame (5) having a front edge (AV) and a rear edge (AR), the seating portion frame (5) being hinged to the base (4) at its rear edge (AR) so as to pivot about a first transverse axis (Y1) of the seat (1) between at least one raised position and one folded position,
a backrest (6) hinged to the base (4) so as to pivot about the first transverse axis (Y1) of the seat (1) between at least one raised position and one folded position,
wherein the seat (1) further comprises hinge means (2) connecting the seating portion frame (5) to the backrest (6), the hinge means being configured so that the pivoting of the backrest (6) relative to the base (4) about the first transverse axis (Y1), between its raised position and its folded position, causes the pivoting of the seating portion frame (5) relative to the base (4) about the first transverse axis (Y1), between its raised position and its folded position, the backrest (6) being pressed against the seating portion frame (5) in their respective folded position, the hinge means (2) also being configured so as to connect the seating portion frame (5) to the floor (P) of the vehicle in order to move the front edge (AV) of the seating portion frame (5) closer to or further away from the floor (P) of the vehicle, the rear edge (AR) of the seating portion frame (5) remaining fixed relative to the base (4).

Clause 2. The seat (1) according to clause 1, wherein the hinge means (2) comprise:
an upper connecting rod (21) having a first longitudinal end (E21) and a second longitudinal end (E21'), the upper connecting rod (21) being hinged at its first longitudinal end (E21) to the seating portion frame (5), at its front edge (AV), so as to pivot about a second transverse axis (Y2) of the seat (1),
a lower connecting rod (22) having a first longitudinal end (E22) and a second longitudinal end (E22'), the lower connecting rod (22) being hinged to the second longitudinal end (E21') of the upper connecting rod (21) at an intermediate hinge point (A22) located between its first longitudinal end (E22) and its second longitudinal end (E22'), so as to pivot about a third transverse axis (Y3) of the seat (1), the lower connecting rod (22) being configured to be hinged to the floor (P) of the vehicle at its second longitudinal end (E22'), so as to pivot about a fourth transverse axis (Y4) of the seat (1), the second longitudinal end (E22') of the lower connecting rod (22) remaining fixed relative to the base (4),
a side connecting rod (23) having a first longitudinal end (E23) and a second longitudinal end (E23'), the side connecting rod (23) being hinged at its first longitudinal end (E23) to the lower connecting rod (22) at its first longitudinal end (E22), so as to pivot about a fifth transverse axis (Y5) of the seat (1), the side connecting rod (23) also being hinged at its second longitudinal end (E23') to the backrest (6), so as to pivot about a sixth transverse axis (Y6) of the seat (1).

Clause 3. The seat (1) according to clause 2, wherein the hinge means (2) comprise:
two upper connecting rods (21): a first upper connecting rod (21) and a second upper connecting rod (21), identical and parallel to each other, and/or
two lower connecting rods (22): a first lower connecting rod (22) and a second lower connecting rod (22), identical and parallel to each other, and/or
two side connecting rods (23): a first side connecting rod (23) and a second side connecting rod (23), identical and parallel to each other.

Clause 4. The seat (1) according to clause 3, wherein the hinge means (2) comprise the two upper connecting rods (21): the first upper connecting rod (21) and the second upper connecting rod (21), identical and parallel to each other,
wherein the front edge (AV) and the rear edge (AR) of the seating portion frame (5) are connected to each other by a first side edge (BL1) and a second side edge (BL2), and
wherein the first upper connecting rod (21) is hinged at its first longitudinal end (E21) to the seating portion frame (5) so as to pivot about the second transverse axis (Y2)

at the first side edge (BL1) of the seating portion frame (5), and wherein the second upper connecting rod (21) is hinged at its first longitudinal end (E21) to the seating portion frame (5) so as to pivot about the second transverse axis (Y2) at the second side edge (BL2) of the seating portion frame (5).

Clause 5. The seat (1) according to one of clauses 2 to 4, wherein the backrest (6) has a lower portion (61) extending under the seating portion frame (5) according to the vertical direction (Z) of the seat (1), at least when the backrest (6) is in its raised position, and
wherein the second longitudinal end (E23') of the or of each side connecting rod (23) is hinged to the backrest (6) along the sixth transverse axis (Y6) at the lower portion (61) of the backrest (6).

Clause 6. The seat (1) according to clause 3, alone or in combination with clause 4 or 5, wherein the hinge means (2) comprise the two side connecting rods (23): the first side connecting rod (23) and the second side connecting rod (23), identical and parallel to each other, and
wherein the backrest has two side walls (62, 63): a first side wall (62) and a second side wall (63), parallel to each other, and
wherein the first side connecting rod (23) is hinged at its second longitudinal end (E23') to the backrest (6) so as to pivot about the sixth transverse axis (Y6) at the first side wall (62) of the backrest (6), and wherein the second side connecting rod (23) is hinged at its second longitudinal end (E23') to the backrest (6) so as to pivot about the sixth transverse axis (Y6) at the second side wall (63) of the backrest (6).

Clause 7. The seat according to one of clauses 2 to 6, wherein the lower connecting rod (22) is hinged at its second longitudinal end (E22'), so as to pivot about the fifth transverse axis (Y5), to an anchoring means (3) that anchors the seat (1) to the floor (P) of the vehicle.

Clause 8. The seat according to one of clauses 2 to 7, wherein the first longitudinal end (E22) and the intermediate hinge point (A22) of the lower connecting rod (22) are offset along the transverse direction (Y) of the seat (1), from the second longitudinal end (E22') of the lower connecting rod (22).

Clause 9. The seat (1) according to one of clauses 1 to 8, comprising a drive means configured to cause the pivoting of the backrest (6) relative to the base (4) about the first transverse axis (Y1), and simultaneously, by means of the hinge means (2), the pivoting of the seating portion frame (5) relative to the base (4) about the first transverse axis (Y1).

Clause 10. The seat (1) according to clause 9, wherein the drive means comprises an electric motor connected to the backrest (6) or to the rear edge (AR) of the seating portion frame (5), so as to cause the pivoting of the backrest (6) relative to the base (4) about the first transverse axis (Y1), respectively the pivoting of the seating portion frame (5) relative to the base (4) about the first transverse axis (Y1).

Clause 11. A vehicle comprising a seat (1) according to one of clauses 1 to 10.

Clause 12. The vehicle according to clause 11, wherein the seat (1) is part of a second row of seats or a third row of seats.

The invention claimed is:

1. A vehicle seat comprising:
a base, intended to be connected to the floor of the vehicle,
a seating portion frame having a front edge and a rear edge, the seating portion frame being hinged to the base at its rear edge so as to pivot about a first transverse axis of the seat between at least one raised position and one folded position,
a backrest hinged to the base so as to pivot about the first transverse axis of the seat between at least one raised position and one folded position,
wherein the seat further comprises hinge means connecting the seating portion frame to the backrest, the hinge means being configured so that the pivoting of the backrest relative to the base about the first transverse axis, between its raised position and its folded position, causes the pivoting of the seating portion frame relative to the base about the first transverse axis, between its raised position and its folded position, the backrest being pressed against the seating portion frame in their respective folded position,
the hinge means also being configured so as to connect the seating portion frame to the floor of the vehicle in order to move the front edge of the seating portion frame closer to or further away from the floor of the vehicle, the rear edge of the seating portion frame remaining not moving along a substantially longitudinal direction of the seat relative to the base.

2. The vehicle seat of claim 1, wherein the hinge means comprises an upper connecting rod having a first longitudinal end and a second longitudinal end, the upper connecting rod being hinged at its first longitudinal end to the seating portion frame, at its front edge, so as to pivot about a second transverse axis of the seat, a lower connecting rod having a first longitudinal end and a second longitudinal end, the lower connecting rod being hinged to the second longitudinal end of the upper connecting rod at an intermediate hinge point located between its first longitudinal end and its second longitudinal end, so as to pivot about a third transverse axis of the seat, the lower connecting rod being configured to be hinged to the floor of the vehicle at its second longitudinal end, so as to pivot about a fourth transverse axis of the seat, the second longitudinal end of the lower connecting rod remaining fixed relative to the base, a side connecting rod having a first longitudinal end and a second longitudinal end, the side connecting rod being hinged at its first longitudinal end to the lower connecting rod at its first longitudinal end, so as to pivot about a fifth transverse axis of the seat, the side connecting rod also being hinged at its second longitudinal end to the backrest, so as to pivot about a sixth transverse axis of the seat.

3. The vehicle seat of claim 2, wherein the hinge means comprise two upper connecting rods: a first upper connecting rod and a second upper connecting rod, identical and parallel to each other, and/or two lower connecting rods: a first lower connecting rod and a second lower connecting rod, identical and parallel to each other, and/or two side connecting rods: a first side connecting rod and a second side connecting rod, identical and parallel to each other.

4. The vehicle seat of claim 3, wherein the hinge means comprise the two upper connecting rods: the first upper connecting rod and the second upper connecting rod, identical and parallel to each other, wherein the front edge and the rear edge of the seating portion frame are connected to each other by a first side edge and a second side edge, and wherein the first upper connecting rod is hinged at its first longitudinal end to the seating portion frame so as to pivot about the second transverse axis at the first side edge of the seating portion frame, and wherein the second upper connecting rod is hinged at its first longitudinal end to the seating portion frame so as to pivot about the second transverse axis at the second side edge of the seating portion frame.

5. The vehicle seat of claim 2, wherein the backrest has a lower portion extending under the seating portion frame according to the vertical direction of the seat, at least when the backrest is in its raised position, and wherein the second longitudinal end of the-side connecting rod is hinged to the backrest along the sixth transverse axis at the lower portion of the backrest.

6. The vehicle seat of claim 3, wherein the hinge means comprise the two side connecting rods: the first side connecting rod and the second side connecting rod, identical and parallel to each other, and wherein the backrest has two side walls: a first side wall and a second side wall, parallel to each other, and wherein the first side connecting rod is hinged at its second longitudinal end to the backrest so as to pivot about the sixth transverse axis at the first side wall of the backrest, and wherein the second side connecting rod is hinged at its second longitudinal end to the backrest so as to pivot about the sixth transverse axis at the second side wall of the backrest.

7. The vehicle seat of claim 2, wherein the lower connecting rod is hinged at its second longitudinal end, so as to pivot about the fifth transverse axis, to a runner that anchors the seat to the floor of the vehicle.

8. The vehicle seat of claim 2, wherein the first longitudinal end and the intermediate hinge point of the lower connecting rod are offset along the transverse direction of the seat, from the second longitudinal end of the lower connecting rod.

9. The vehicle seat of claim 1, comprising a drive means configured to cause the pivoting of the backrest relative to the base about the first transverse axis, and simultaneously, by means of the hinge means, the pivoting of the seating portion frame relative to the base about the first transverse axis.

10. The vehicle seat of claim 9, wherein the drive means comprises an electric motor connected to the backrest or to the rear edge of the seating portion frame, so as to cause the pivoting of the backrest relative to the base about the first transverse axis, respectively the pivoting of the seating portion frame relative to the base about the first transverse axis.

11. A vehicle comprising the vehicle seat of claim 1.

12. The vehicle of claim 11, wherein the vehicle seat is part of a second row of seats or a third row of seats.

* * * * *